(12) United States Patent
Tourneur (10) Patent No.: US 12,250,464 B2
(45) Date of Patent: Mar. 11, 2025

(54) PROCESS FOR THE ACQUISITION OF IMAGES OF A SPACE OBJECT IN TERRESTRIAL ORBIT BY A SPACECRAFT IN TERRESTRIAL ORBIT

(71) Applicant: AIRBUS DEFENCE AND SPACE SAS, Toulouse (FR)

(72) Inventor: Cyrille Tourneur, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 18/711,010

(22) PCT Filed: Nov. 16, 2022

(86) PCT No.: PCT/FR2022/052110
§ 371 (c)(1),
(2) Date: May 16, 2024

(87) PCT Pub. No.: WO2023/089275
PCT Pub. Date: May 25, 2023

(65) Prior Publication Data
US 2025/0024153 A1 Jan. 16, 2025

(30) Foreign Application Priority Data
Nov. 17, 2021 (FR) ...................................... 2112045

(51) Int. Cl.
*H04N 23/695* (2023.01)
(52) U.S. Cl.
CPC ................................. *H04N 23/695* (2023.01)
(58) Field of Classification Search
None
See application file for complete search history.

(56) References Cited

U.S. PATENT DOCUMENTS

2007/0292046 A1* 12/2007 Johnson .................. G06T 3/073
382/275
2016/0031559 A1* 2/2016 Zang ..................... G05D 1/0094
701/2

FOREIGN PATENT DOCUMENTS

CN 111121765 A * 5/2020 ............. G01C 21/16

OTHER PUBLICATIONS

International Search Report with English Translation for Application No. PCT/FR2022/052110, dated Feb. 7, 2023, 6 pages.
(Continued)

*Primary Examiner* — Edemio Navas, Jr.
(74) *Attorney, Agent, or Firm* — Nixon & Vanderhye P.C.

(57) ABSTRACT

A process for the acquisition, by a spacecraft in terrestrial orbit, of a useful image of a space object in terrestrial orbit that is gradually approaching the spacecraft from an upstream distal region towards a proximal region is disclosed including controlling the orientation of an array-type detection sensor in order to orient it towards the space object located in the upstream distal region, acquiring, via the array-type detection sensor, a so-called detection image of the space object located in the upstream distal region, determining trajectory-tracking information on the basis of the detection image, controlling the orientation of an array-type acquisition sensor on the basis of trajectory-tracking information, in order to orient it towards the space object located in the proximal region, acquiring, via the array-type acquisition sensor, a useful image of the space object located in the proximal region.

15 Claims, 4 Drawing Sheets

(56) References Cited

OTHER PUBLICATIONS

Written Opinion of the ISA for Application No. PCT/FR2022/052110, dated Feb. 7, 2023, 8 pages.

* cited by examiner

PROCESS FOR THE ACQUISITION OF IMAGES OF A SPACE OBJECT IN TERRESTRIAL ORBIT BY A SPACECRAFT IN TERRESTRIAL ORBIT

CROSS REFERENCE TO RELATED APPLICATIONS

The present application is a National Phase of International Application Number PCT/FR2022/052110 filed Nov. 16, 2022, which designated the U.S. and claims priority benefits from French Application No. FR2112045, filed Nov. 17, 2021, the entire contents of each of which are hereby incorporated by reference.

TECHNICAL FIELD

This invention falls within the field of observation by spacecraft such as satellites, and more particularly relates to a process for the acquisition, by a spacecraft in terrestrial orbit, of images representing a space object in terrestrial orbit, as well as to a spacecraft for implementing such a process for the acquisition of images.

PRIOR ART

In certain applications, referred to as "Space Situational Awareness" or SSA, it is desired to be able to produce images of space objects in terrestrial orbit. Such images may for example be used to obtain technical information about a space object (for example operated by a third party or not under control in the case of space debris), but also for the purposes of investigation and analysis following an anomaly concerning this space object (for example to observe damage caused by a micrometeorite, etc.). The images to be acquired may be images within the visible wavelength range, the infrared range, etc.

A spacecraft, such as a satellite equipped with an image sensor, may be used to acquire these images of the space object. The particular advantage of acquiring images from a satellite is that it is then possible to observe the space object more closely than from the ground, and therefore to obtain images of the space object that are of better resolution. A satellite in terrestrial orbit, for example in low Earth orbit (or LEO) or medium Earth orbit (or MEO), can thus be used to acquire images of a space object in LEO or MOE orbit.

In general, it is desirable to observe the space object as closely as possible in order to obtain the best possible resolution in the acquired images. However, the field of view of the image sensor, representing the solid angle that can be observed simultaneously, can be quite narrow, for example less than 1°. Consequently, to be able to acquire an image of the space object when the satellite is close to the space object, it is necessary to have good knowledge of the respective positions and speeds of the space object and of the satellite. Otherwise, the probability that the space object is not at the expected location, and therefore is outside the field of view of the satellite image sensor when acquiring the image, is high.

Although the error in estimating the position and speed of the imaging satellite can be made negligible, for example by using an embedded navigation system (such as a Global Navigation Satellite System or GNSS), this is generally not the case for the space object to be imaged, in particular due to the fact that the space object may not be under any control (for example in the case of space debris) or is operated by a non-cooperative third party from whom it is not possible to obtain a precise state vector of the space object.

The sources of error in estimating the position and speed of the space object to be imaged comprise in particular:
the intrinsic imprecision of the public two-line elements (TLE) of the space object, when these are used to estimate a state vector of the space object, and the fact that the analytical model used for the propagation of TLEs ("Simplified General Perturbations Satellite Orbit Model" or SGP4) is intrinsically imprecise,
the propagation uncertainties between the time of the last measurement of the state vector of the space object and the time of the acquisition of an image of the space object, due to not knowing the solar radiation pressure coefficient of the space object as well as to the uncertainties in the atmospheric density models and in the ballistic coefficient of the space object (for space objects in LEO orbit),
the execution of an orbit control maneuver by the space object between the date of the last TLE and the date of the image acquisition, etc.

There is therefore a need for a solution which allows producing images as close as possible to the space object, in order to obtain the best possible resolution in the images, while reducing the probability that the space object is not located within the field of view of the satellite's image sensor during the acquisitions.

PRESENTATION OF THE INVENTION

The present invention aims to remedy some or all of the disadvantages of the prior art, in particular those set forth above.

For this purpose, and according to a first aspect, a process is proposed for the acquisition, by a spacecraft in terrestrial orbit, of a so-called "useful" image of a space object in terrestrial orbit, said space object being visible from the spacecraft on a trajectory along which the space object is gradually approaching the spacecraft from an upstream distal region of said trajectory towards a proximal region of said trajectory where a distance between the space object and the spacecraft is minimized, said process comprising steps of:
  controlling the orientation of an array-type detection sensor of the spacecraft in order to orient a line of sight of said array-type detection sensor towards the space object when said space object is located in the upstream distal region,
  acquiring, via the array-type detection sensor, at least one so-called detection image of the space object located in the upstream distal region,
  determining trajectory-tracking information on the basis of the at least one detection image,
  controlling the orientation of an array-type acquisition sensor, on the basis of trajectory-tracking information, in order to orient a line of sight of said array-type acquisition sensor towards the space object when said space object is located in the proximal region,
  acquiring, via the array-type acquisition sensor, at least one useful image of the space object located in the proximal region.

Thus, the space object moves along a trajectory, visible from the spacecraft, in which said space object is gradually approaching the spacecraft from an upstream distal region of said trajectory towards a proximal region of said trajectory in which a distance between the space object and the spacecraft is minimized. Next, the trajectory also includes a downstream portion of the trajectory, which is beyond the scope of this disclosure, in which the space object is gradually moving away from the spacecraft until it is no longer visible from the spacecraft. "Visible" is understood here to mean that there is a direct optical line between the space object and the spacecraft (and therefore the space object is not obscured by the Earth), regardless of whether the space object is actually within the field of view of an image sensor of the spacecraft.

The upstream distal region thus corresponds to a portion of the trajectory in which the space object is far away from the spacecraft. The proximal region corresponds to a portion of the trajectory in which the space object is close to the spacecraft. The upstream distal region and the proximal region are at a distance from each other, meaning they are not contiguous to each other (and are therefore separated by an upstream intermediate region of the trajectory which is not null). Here, we propose the acquisition of mainly two types of images of the space object on its trajectory, by means of at least one array-type sensor:

one or more of so-called detection images, acquired when the space object is in the upstream distal region, one or more of so-called useful images, acquired when the space object is in the proximal region.

By convention, the array-type sensor used to acquire the detection images is called a "detection" sensor while the array-type sensor used to acquire the useful images is called an "acquisition" sensor. However, depending on the embodiments considered, the array-type detection sensor and the array-type acquisition sensor may be combined (the same array-type sensor acquires the detection images and the useful images) or be separate.

Useful images are "useful" compared to detection images, in that the space object is represented in them with better resolution than in the detection images, to the extent that the space object is closer to the spacecraft. The particular aim of detection images, as their name indicates, is to detect the space object (without attempting to have good resolution). Indeed, in the upstream distal region, the distance between the space object and the spacecraft is much greater than in the proximal region, and the probability that the space object is in the field of view of the array-type detection sensor despite an error in estimating the position of the space object is much higher than in the proximal region. It is therefore easier to obtain an image in the upstream distal region in which the space object is actually represented. Even if the space object is then represented with low resolution (the space object may be represented by a single pixel in certain cases), detection images make it possible to determine the position and/or speed of the space object in relation to the spacecraft.

Based on a detection image representing the space object, it is possible to determine trajectory-tracking information. This trajectory-tracking information allows reducing the effects of error in the estimation of the position and/or speed of the space object relative to the spacecraft. Some or all of this guidance-tracking information may therefore be used, directly or indirectly, to reduce the error in the estimation of the position and/or speed of the space object when it is in the proximal region, and therefore to reduce the probability that the space object is outside the field of view of the array-type acquisition sensor when the space object is in the proximal region, despite the proximity between the space object and the spacecraft. The acquisition of useful images when the space object is close to the spacecraft (proximal region) is therefore made possible due to the prior acquisition of detection images when the space object is far away (upstream distal region) from the spacecraft.

The use of an array-type sensor for the acquisition of useful images makes it possible to have 2D images of the space object directly and makes it easier to schedule acquisitions, in particular compared to a "push-broom" scanner, and takes into account the significant relative speeds of the space object compared to the spacecraft. The use of an array-type sensor for the acquisition of detection images makes it possible to have 2D images of the space object in which the coordinates of the space object in the detection image are representative of the actual position of the space object in its orbit and may be used to determine trajectory-tracking information, ultimately allowing the line of sight of the array-type acquisition sensor to be correctly oriented during the acquisition of useful images.

In some particular modes of implementation, the acquisition method may optionally further include one or more of the following features, individually or in any technically possible combinations.

In some particular modes of implementation, the array-type acquisition sensor of the spacecraft is also utilized to acquire images of areas on the surface of the Earth.

In some particular modes of implementation, the line of sight of the array-type acquisition sensor is fixed in the spacecraft frame of reference, and controlling the orientation of said array-type acquisition sensor consists of controlling the attitude of the spacecraft.

In some particular modes of implementation, the array-type detection sensor and the array-type acquisition sensor are a same array-type sensor, and the process for acquisition comprises:

successive acquisitions of so-called tracking images, via the array-type sensor, during movement of the space object from the upstream distal region to the proximal region, and determination of associated trajectory-tracking information, controlling the orientation of the array-type sensor during the successive acquisitions of tracking images, on the basis of the trajectory-tracking information, in order to keep the space object in a field of view of said array-type sensor.

In some particular modes of implementation, the process for acquisition comprises a step of predicting, on the basis of the trajectory-tracking information, a position of the space object at a later time referred to as the "tracking resumption time", and the orientation of the array-type acquisition sensor is controlled so as to have the line of sight of said array-type acquisition sensor oriented towards the predicted position at the tracking resumption time.

In some particular modes of implementation, the predicted position for the tracking resumption time is determined by means of an estimation filter (for example a Kalman filter), and the trajectory-tracking information determined for the detection image is used to readjust a state vector (comprising for example the position and speed of the space object) of said estimation filter.

In some particular modes of implementation, the process for acquisition comprises, after the acquisition of the at least one detection image and before the acquisition of the at least one useful image, an acquisition of one or more images of areas on the surface of the Earth by means of the array-type acquisition sensor. Indeed, because the error in the predicted position of the space object is reduced due to taking into account the guidance-tracking information, the spacecraft may carry out other tasks while awaiting the tracking resumption time, including the acquisition of images of the Earth by means of the array-type acquisition sensor.

In some particular modes of implementation, the array-type detection sensor is separate from the array-type acquisition sensor. For example, the array-type detection sensor may be an instrument with a very large field of view (not enabling images of sufficient resolution of the space object in the proximal region to be obtained), dedicated to the acquisition of detection images or perhaps also used to carry out other operations. For example, the array-type detection sensor is a star tracker which is also utilized to estimate the attitude of the spacecraft.

In some particular modes of implementation, the array-type detection sensor and the array-type acquisition sensor are the same array-type sensor, preferably also utilized in the context of an Earth observation mission to acquire images of the Earth.

In some particular modes of implementation, controlling the orientation in order to acquire the at least one detection image comprises controlling the line of sight of the array-type sensor in order to successively orient said line of sight towards different possible positions of the space object in the upstream distal region of the trajectory, until at least one detection image representing said space object is obtained.

According to a second aspect, a spacecraft intended to be placed in terrestrial orbit is proposed, comprising:
 at least one array-type sensor adapted for acquiring images,
 means for controlling the orientation of the at least one array-type sensor,
 a processing circuit configured for controlling the at least one array-type sensor and the means for controlling the orientation in order to implement a process for the acquisition of a useful image according to any one of the modes of implementation of this disclosure.

In some particular embodiments, the spacecraft may optionally further include one or more of the following features, individually or in any technically possible combinations.

In some particular embodiments, the at least one array-type sensor comprises an array-type detection sensor for the acquisition of detection images and an array-type acquisition sensor for the acquisition of useful images, said array-type detection sensor being separate from the array-type acquisition sensor. For example, the array-type detection sensor may be an instrument with a very large field of view, dedicated to the acquisition of detection images or perhaps also used to carry out other operations. For example, the array-type detection sensor is a star tracker which is also utilized to estimate the attitude of the spacecraft, and the array-type acquisition sensor is also utilized in the context of an Earth observation mission to acquire images of the Earth.

In some particular embodiments, the at least one array-type sensor comprises a single array-type sensor for the acquisition of detection images and for the acquisition of useful images. Preferably, this array-type sensor is also utilized in the context of an Earth observation mission to acquire images of the Earth.

PRESENTATION OF FIGURES

The invention will be better understood upon reading the following description, given by way of non-limiting example and with reference to the figures which represent.

In these figures, identical references from one figure to another designate identical or similar elements. For clarity, the items represented are not to scale unless otherwise noted.

DESCRIPTION OF EMBODIMENTS

Figure 1:
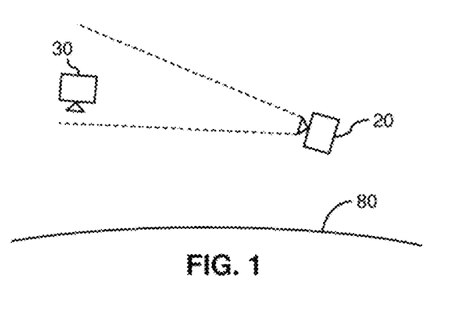
FIG. 1: a schematic representation of a spacecraft and of a space object in terrestrial orbit.

FIG. 1 schematically represents a spacecraft in a moving orbit around the Earth 80. Preferably, the spacecraft is in a terrestrial orbit, for example a LEO or MEO orbit. However, nothing excludes considering other types of orbits according to other examples, in particular geosynchronous orbits (GSO).

In the example illustrated in FIG. 1, the spacecraft is a satellite 20. However, nothing excludes considering other types of spacecraft (space shuttle, probe, etc.) in other examples not described.

Satellite 20 is utilized to acquire images of a space object 30, also in terrestrial orbit, for example an LEO or MEO orbit. In the example illustrated in FIG. 1, space object 30 is another satellite which may be operated by the same operator as satellite 20 or by a different operator (third party). According to other examples, space object 30 may be space debris or any other type of space object, artificial or non-artificial.

To acquire images of space object 30, it must be visible from satellite 20, in particular meaning that space object 30 must not be obscured by the Earth 80.

Other constraints may also apply, related for example to the wavelength range in which the images are to be acquired. For example, if the images are to be acquired in the visible wavelength range, space object 30 must also be illuminated by the Sun, whereas this is not necessary if the images are to be acquired in the infrared range, etc.

Figure 2:
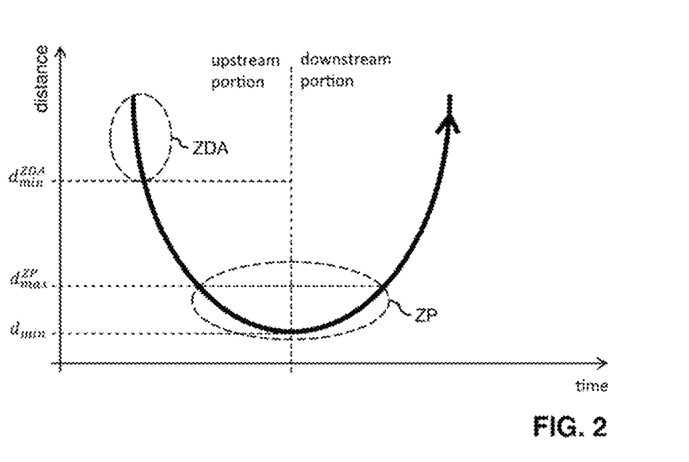
FIG. 2: a curve representing different regions of a trajectory of the space object in relation to the spacecraft.

An opportunity for image acquisition arises when space object 30 is visible from satellite 20. Such opportunities for image acquisition recur as space object 30 and satellite 20 move around Earth 80 in their respective orbits. FIG. 2 schematically represents the evolution over time of the distance between space object 30 and satellite 20 during an opportunity for image acquisition. As illustrated by FIG. 2, space object 30 follows a trajectory relative to satellite 20, along which space object 30 gradually approaches satellite 20 until reaching a minimum distance $d_{min}$, then gradually moves away from satellite 20. The portion of the trajectory during which space object 30 and satellite 20 are approaching each other is called the upstream portion of the trajectory, while the portion during which space object 30 and satellite 20 are moving away from each other is called the downstream portion of the trajectory.

As illustrated by FIG. 2, in the upstream portion, space object 30 gradually approaches from an upstream distal region ZDA of said trajectory, which corresponds to the region of the upstream portion of said trajectory in which space object 30 is furthest from satellite 20, to a proximal region ZP of said trajectory, which corresponds to the region of said trajectory in which space object 30 is closest to satellite 20.

It is therefore in proximal region ZP of the trajectory that the images of space object 30 providing the best resolution, called useful images, can be acquired from satellite 20. However, it is also in proximal region ZP that the probability of missing space object 30 (space object 30 being outside the field of view) is highest in the event of errors in estimating the relative position and/or speed of space object 30 relative to satellite 20. In upstream distal region ZDA, the resolution of space object 30 is much lower, but the probability of missing space object 30 is much lower there than in proximal region ZP.

As illustrated by FIG. 2, the upstream distal region corresponds to distances between space object 30 and satellite 20 which are greater than a distance $d_{min}^{ZDA}$, and proximal region ZP corresponds to distances between space object 30 and satellite 20 that are less than $d_{max}^{ZP}$, with $d_{min}^{ZDA} > d_{max}^{ZP}$. The present disclosure is not limited to particular values for distances $d_{min}^{ZDA}$ and $d_{max}^{ZP}$, and what is important is that upstream distal region ZDA corresponds to the most distant positions of space object 30 on the trajectory relative to satellite 20, and proximal region ZP corresponds to the closest positions of space object 30 on the trajectory relative to satellite 20. Upstream distal region ZDA and proximal region ZP are also at a distance from each other, i.e. not contiguous. For example, $d_{min}^{ZDA} - d_{max}^{ZP} \geq d_{min}$ or $d_{min}^{ZDA} - d_{max}^{ZP} \geq 2 \times d_{min}$, i.e. space object 30 has moved closer to satellite 20 by at least $d_{min}$ or $2 \times d_{min}$ between upstream distal region ZDA and proximal region ZP. For example, $d_{min}^{ZDA} \geq 3 \times d_{min}$ or $d_{min}^{ZDA} \geq 5 \times d_{min}$, and $d_{max}^{ZP} \leq 2 \times d_{min}$.

Figure 3:
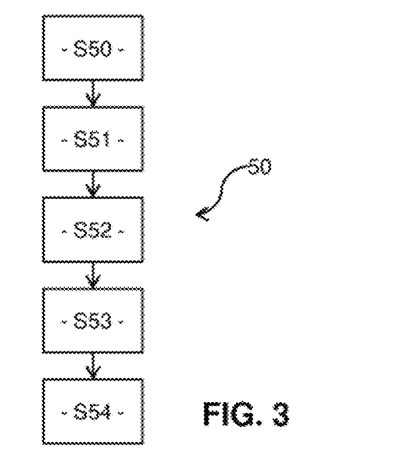
FIG. 3: a diagram representing the main steps in a process for the acquisition of a useful image.

FIG. 3 represents the main steps of one exemplary implementation of a process 50 for the acquisition of useful images during the movement of space object 30 on the trajectory visible from satellite 20.

As illustrated by FIG. 3, the process 50 of acquisition firstly comprises a step S50 of controlling the orientation of an array-type detection sensor of satellite 20 in order to orient a line of sight of said array-type detection sensor towards space object 30 when said space object is located in upstream distal region ZDA. The orientation of the array-type detection sensor is controlled so as to orient the line of sight towards an estimated position of space object 30 on its trajectory, in upstream distal region ZDA. For this purpose, satellite 20 comprises means for controlling the orientation of the line of sight of the array-type detection sensor, considered to be known to those skilled in the art. These are for example mechanical means (movable mirrors, etc.) which allow modifying the line of sight of the array-type detection sensor within the satellite frame of reference and/or also means for controlling the attitude of satellite 20 (reaction wheels, gyroscopic actuators, thrusters, etc.). If the line of sight of the array-type detection sensor is fixed in the satellite frame of reference, the means for controlling the orientation consist of means for controlling the attitude.

The process 50 of acquisition then comprises a step S51 of acquiring, via the array-type detection sensor, at least one so-called detection image of space object 30 located in upstream distal region ZDA.

For the reasons mentioned above, the error in the estimation of the position and/or speed of space object 30 may not be negligible. However, since space object 30 is located in upstream distal region ZDA, it is unlikely that space object 30 is outside the field of view of the array-type detection sensor due to estimation error. Indeed, at most, the estimation error will more likely result in an offset of space object 30 in the detection image, its actual coordinates in the detection image being different from the theoretical coordinates where space object 30 should have been found in the absence of any estimation error.

To further reduce the probability of missing space object 30 in upstream distal region ZDA, it is possible, in some particular modes of implementation, to control the orientation of the array-type detection sensor so as to successively orient the line of sight of said array-type detection sensor towards different possible positions of space object 30 in upstream distal region ZDA of the trajectory, until at least one detection image showing said space object 30 is obtained. Thus, the line of sight of the array-type detection sensor will sweep a solid angle around the estimated position of space object 30 in order to search for space object 30 around this estimated position, until an image is acquired in which space object 30 is detected. Such a sweep may be done for example in a spiral (for example gradually moving away from the estimated position), in a zigzag, etc.

The process 50 of acquisition also includes a step S52 of determining so-called trajectory-tracking information, on the basis of the at least one detection image. This guidance-tracking information, which aims to reduce uncertainty about the position of space object 30 when it is in proximal region ZP, may be of any suitable type and examples will be given below within the framework of a description of some specific modes of implementation of the process 50 of acquisition.

The process 50 of acquisition then comprises a step S53 of controlling the orientation of an array-type acquisition sensor, on the basis of trajectory-tracking information, in order to orient a line of sight of said array-type acquisition sensor towards space object 30 when said space object is located in proximal region ZP. For this purpose, satellite 20 comprises means for controlling the orientation of the line of sight of the array-type acquisition sensor. Everything that was stated above for controlling the orientation of the array-type detection sensor also applies for the array-type acquisition sensor.

The process 50 of acquisition then comprises a step S54 of acquiring, via the array-type acquisition sensor, at least one useful image of space object 30 located in proximal region ZP.

Thus, it is therefore proposed to acquire images of space object 30 when it is far from satellite 20 (in upstream distal region ZDA of the trajectory), referred to as detection images, which are used to determine what is referred to as guidance-tracking information, making it possible to acquire useful images under better conditions when space object 30 is close to satellite 20 (in proximal region ZP of the trajectory). Therefore, if $d_{min}^{ZDA} - d_{max}^{ZP} \geq d_{min}$ or $d_{min}^{ZDA} - d_{max}^{ZP} \geq 2 \times d_{min}$, then space object 30 has moved closer to satellite 20 by at least $d_{min}$ or $2 \times d_{min}$ between the acquisition of the last detection image and the acquisition of the first useful image.

As indicated above, the array-type sensor used to acquire the detection images is called a "detection" sensor, while the array-type sensor used to acquire the useful images is called an "acquisition" sensor. However, depending on the modes of implementation concerned, the array-type detection sensor and the array-type acquisition sensor may be combined (the same array-type sensor acquires the detection images and the useful images) or may be separate from each other.

In the remainder of the description, two particular modes of implementation are described, which are in no way limiting to this disclosure.

Figure 4:
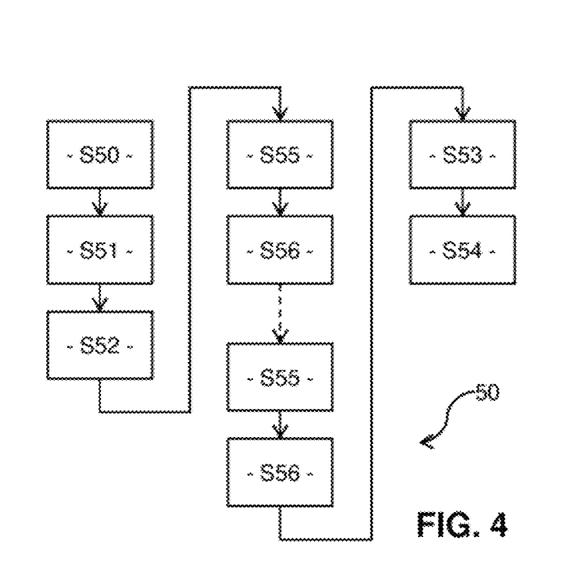
FIG. 4: a diagram representing a first mode of implementation of a process of acquisition.

FIG. 4 schematically represents the main steps of a first mode of implementation of the process 50 of acquisition.

In the mode of implementation illustrated by FIG. 4, the array-type detection sensor and the array-type acquisition sensor are the same array-type sensor 40. For example, it may be an array-type sensor 40 which is also utilized as part of an Earth observation mission 80, to acquire images of Earth 80. In such a case, array-type sensor 40 is used to acquire images of Earth 80 and to acquire images of space object 30, and controlling the orientation of the line of sight comprises or consists of controlling the attitude of satellite 20 in order to move from an orientation towards Earth 80 to an orientation towards space object 30.

Once space object 30 is detected in a detection image, satellite 20 will lock the line of sight of said array-type sensor 40 on the space object 30 until space object 30 is sufficiently close to satellite 20 for the acquisition of a useful image of space object 30. In other words, the line of sight of array-type sensor 40 is kept constantly pointed towards space object 30 as it approaches satellite 20, and array-type sensor 40 continuously follows the movement of space object 30, including in the upstream intermediate region of the trajectory.

As illustrated by FIG. 4, the process 50 of acquisition comprises, in addition to the steps described with reference to FIG. 3, steps which are executed after having acquired the at least one detection image and before acquiring a useful image. More particularly, the process 50 of acquisition comprises the following steps, which are iterated until the step S53 of controlling the orientation in order to acquire the at least one useful image:
  a step S55 of controlling the orientation of array-type sensor 40, on the basis of trajectory-tracking information, so as to follow the movement of space object 30 on its trajectory and to keep it in the field of view of array-type sensor 40,
  a step S56 of acquiring a so-called tracking image, via array-type sensor 40, and determining associated trajectory-tracking information.

Thus, during movement of space object 30, the line of sight of array-type sensor 40 is controlled to keep space object 30 in the field of view of space object 30, on the basis of guidance-tracking information determined from images (first detection images then tracking images) acquired during the movement of space object 30. For example, the guidance-tracking information may be determined based on the coordinates of space object 30 in the images (first detection then tracking), and used to lock the orientation of array-type sensor 40 so as to keep space object 30 substantially at the same coordinates from one image to the next. This orientation control may also take into account the relative movements of space object 30 in relation to satellite 20.

Figure 5:
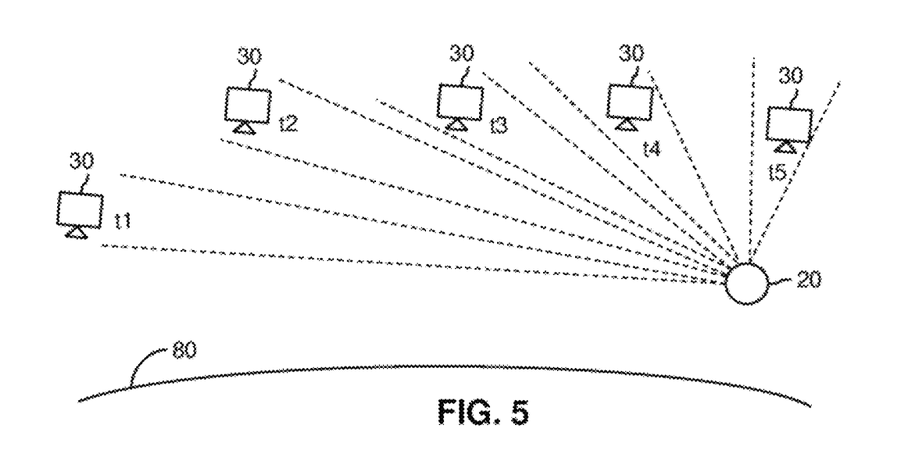
FIG. 5: a schematic representation of the progress over time of the process of acquisition of FIG. 4,
 FIG. 6: a diagram representing a second mode of implementation of a process of acquisition.

FIG. 5 schematically represents the progress of the process 50 of acquisition of FIG. 4 over time (with ti<tj if i<j). In FIG. 5, satellite 20 is always shown in the same position, but it is understood that space object 30 and satellite 20 are both moving in their respective terrestrial orbits.

As illustrated by FIG. 5, at time t1, space object 30 is in upstream distal region ZDA and the line of sight of array-type sensor 40 of satellite 20 is oriented towards said space object. Array-type sensor 40 acquires a detection image at time t1. Optionally, it is possible to acquire several detection images, for example in order to estimate the speed of movement of space object 30 relative to satellite 20. Next, satellite 20 tracks space object 30 by means of array-type sensor 40, until space object 30 is close enough for the acquisition of a useful image. For this purpose, array-type sensor 40 is used to carry out several successive acquisitions of tracking images, at times t2, t3, and t4 (in practice, the number of tracking images may be higher). Simultaneously, the orientation of array-type sensor 40 is controlled so as to keep space object 30 in the field of view of said array-type sensor, for example substantially in the center of said field of view and of the tracking images. At a time t5, space object 30 is located in proximal region ZP relative to satellite 20, and array-type sensor 40, its line of sight oriented towards space object 30, is able to acquire one or more useful images.

Figure 6:
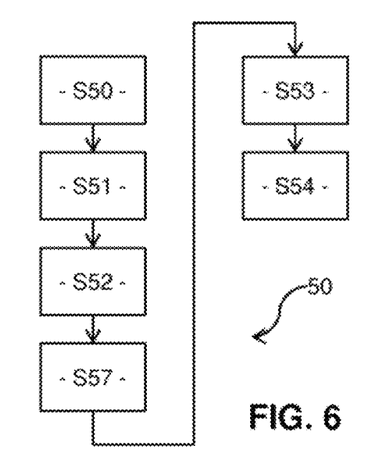

FIG. 6 schematically represents the main steps of a second mode of implementation of the process 50 of acquisition.

In the mode of implementation illustrated by FIG. 6, the array-type detection sensor and the array-type acquisition sensor may be separate or they may be the same array-type sensor 40. In the remainder of the description, we consider in a non-limiting manner that the same array-type sensor 40 is utilized for the acquisition of detection images and for the acquisition of useful images. As above, it may be an array-type sensor 40 which is also utilized in the context of an Earth 80 observation mission, to acquire images of Earth 80.

Once space object 30 is detected in a detection image, array-type sensor 40 does not constantly track the movement of space object 30, until space object 30 is sufficiently close to satellite 20. In other words, between the acquisition of the at least one detection image and the acquisition of the at least one useful image, there exist one or more time intervals, referred to as tracking interruption intervals, during which space object 30 is no longer in the field of view of array-type sensor 40 (or is no longer in the field of view of the array-type detection sensor nor in the field of view of the array-type acquisition sensor in the case of separate array-type sensors). During a tracking interruption interval, satellite 20 may perform other tasks, such as acquiring images of the surface of Earth 80.

As illustrated in FIG. 6, the process 50 of acquisition comprises, in addition to the steps described with reference to FIG. 3, a step S57 of predicting, on the basis of the trajectory-tracking information determined for the at least one detection image, a position of space object 30 at a later time referred to as the "tracking resumption time". As its name indicates, the tracking resumption time comes after a tracking interruption interval, and corresponds to the time at which space object 30 must again be within the field of view of array-type sensor 40. In the example illustrated by FIG. 6, the tracking resumption time corresponds to a moment when space object 30 is supposed to be within proximal region ZP, and the step S53 of controlling the orientation in order to acquire a useful image is executed on the basis of the predicted position (and therefore indirectly on the basis of the trajectory-tracking information) so as to have the line of sight of array-type sensor 40 oriented towards the predicted position at the tracking resumption time.

For example, the trajectory-tracking information may be determined by comparing the theoretical coordinates of space object 30 in the detection image and the actual coordinates of space object 30 in said detection image. The theoretical coordinates correspond to the coordinates where space object 30 should be located in the detection image if the estimated position of space object 30 on its trajectory were correct. The actual coordinates correspond to the coordinates where space object 30 is actually located in the detection image, which are different from the theoretical coordinates if the estimated position of space object 30 on its trajectory is marred by errors. Such a comparison in one or more detection images may thus be used to evaluate the error made and to take this into account in subsequent estimates of the position and/or speed of space object 30. For example, the predicted position for the tracking resumption time is determined by means of an estimation filter, for example a Kalman filter or any other type of suitable estimation filter, and the trajectory-tracking information determined for the detection image is used to realign a state vector (comprising for example the position and speed of the space object) of said estimation filter. The estimation filter may then be utilized in a conventional manner to predict the position of space object 30 at the tracking resumption time, on the basis of a predetermined model of the movement of space object 30 and of satellite 20.

Figure 7:
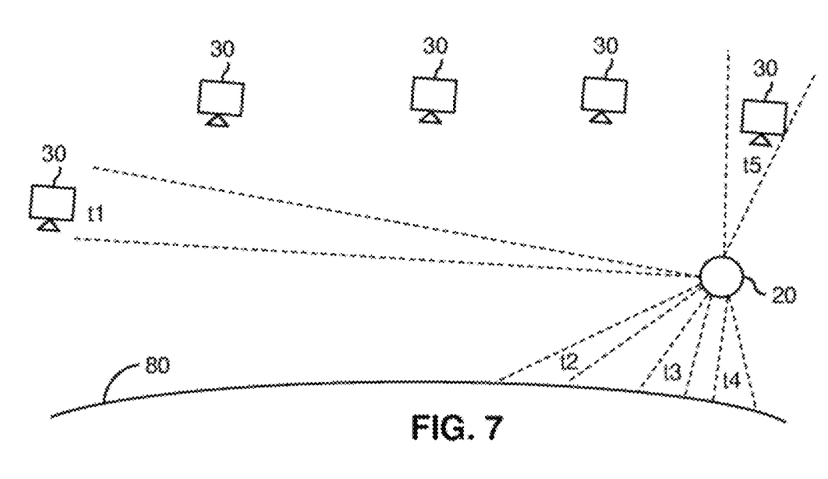
FIG. 7: a schematic representation of the progress over time of the process of acquisition of FIG. 6,
 FIG. 8: a schematic representation of the progress over time of a variant implementation of the process of acquisition of FIG. 6,
 FIG. 9: a schematic representation of a first exemplary embodiment of a satellite for implementing a process of acquisition.

FIG. 7 schematically represents the progress over time of the process 50 of acquisition of FIG. 6 (with ti<tj if i<j). In FIG. 7, satellite 20 is always shown in the same position, but it is understood that space object 30 and satellite 20 are both moving in their respective terrestrial orbits.

As illustrated by FIG. 7, at a time t1, space object 30 is in upstream distal region ZDA and the line of sight of array-type sensor 40 of satellite 20 is oriented towards said space object. Array-type sensor 40 acquires a detection image at time t1. Optionally, it is possible to acquire several detection images, for example in order to estimate the speed of movement of space object 30 relative to satellite 20. Satellite 20 determines the trajectory-tracking information and determines the predicted position of space object 30 for a tracking resumption time t5. In the example of FIG. 7, at tracking resumption time t5, space object 30 is in proximal region ZP relative to satellite 20. There is therefore a tracking interruption interval which, in the example of FIG. 7, satellite 20 uses to acquire images of Earth 80 at times t2, t3, and t4, by means of array-type sensor 40. At tracking resumption time t5, the line of sight of array-type sensor 40 has been oriented towards the predicted position, and array-type sensor 40 may acquire a useful image at time t5 or at a later time.

It should be noted that, according to other examples, the tracking resumption time may precede the entry of space object 30 into proximal region ZP of the trajectory relative to satellite 20. Starting from this tracking resumption time, it is possible for example to perform the tracking in a substantially continuous manner, starting from the tracking resumption time, by applying the steps described with reference to FIG. 4 (acquisition of tracking images and determination of associated trajectory-tracking information, controlling the orientation in order to keep space object 30 in the field of view of array-type sensor 40). According to another example, it is possible to acquire a tracking image representing space object 30 at the tracking resumption time (by means of the array-type detection sensor or the array-type acquisition sensor if they are separate array-type sensors) and from this to deduce a predicted position for a second tracking resumption time that follows a second tracking interruption interval, etc.

Figure 8:
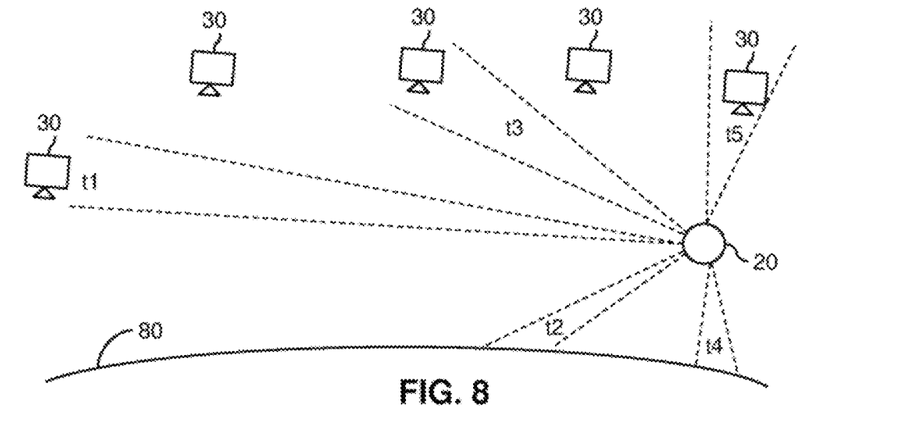

FIG. 8 schematically represents the progress over time of the process 50 of acquisition of FIG. 6 (with ti<tj if i<j), in the case where two tracking interruption intervals are planned. As illustrated by FIG. 8, at a time t1, space object 30 is in upstream distal region ZDA and the line of sight of array-type sensor 40 of satellite 20 is oriented towards said space object. Array-type sensor 40 acquires a detection image at time t1, and satellite 20 determines the predicted position of space object 30 for a tracking resumption time t3. During a first tracking interruption interval between times t1 and t3, satellite 20 for example acquires an image of Earth 80 at time t2. At tracking resumption time t3, the line of sight of array-type sensor 40 has been oriented towards the predicted position, and array-type sensor 40 acquires a tracking image and satellite 20 determines the predicted position of space object 30 for a tracking resumption time t5, at which time space object 30 is located within proximal region ZP. During a second tracking interruption interval between times t3 and t5, satellite 20 for example acquires an image of Earth 80 at time t4. At tracking resumption time t5, the line of sight of array-type sensor 40 has been oriented towards the predicted position, and array-type sensor 40 may acquire a useful image at time t5 or at a later time.

Figure 9:
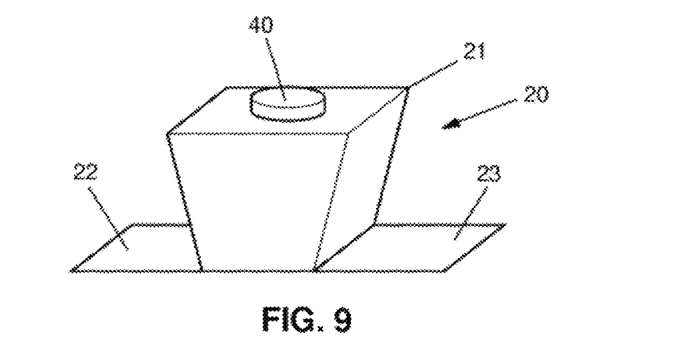

FIG. 9 schematically represents one exemplary embodiment of a satellite 20 for implementing the process 50 of acquisition, in the case where a same array-type sensor 40 is used for the acquisition of detection images and of useful images (and, where appropriate, tracking images).

As illustrated by FIG. 9, satellite 20 comprises two solar generators 22, 23 arranged on respective opposite faces of a body 21 of satellite 20. In this example, array-type sensor 40 is arranged on a face connecting said faces carrying solar generators 22, 23. It should be noted that array-type sensor 40 is typically part of an observation instrument which may further comprise optics comprising one or more mirrors, array-type sensor 40 being arranged at a focal plane of said optics.

Satellite 20 also comprises means for controlling the orientation of array-type sensor 40 (not shown in the figures). These means for controlling the orientation comprise for example means for controlling the attitude of said satellite 20, such as inertial actuators (reaction wheels, gyroscopic actuators, magnetorquers, etc.). In addition to the means for controlling the attitude, the means for controlling the orientation may comprise mechanical means (movable mirrors, etc.) which allow varying the line of sight of array-type sensor 40 within the satellite frame of reference.

Satellite 20 further comprises a processing circuit (not shown in the figures), which controls the operation of the means for controlling the orientation and array-type sensor 40. The processing circuit comprises, for example, one or more processors (CPU, DSP, FPGA, ASIC, etc.) and one or more memories (magnetic hard drive, semiconductor memory, optical disk, etc.) in which, for example, a computer program product is stored in the form of a set of program code instructions to be executed by the processor(s) in order to implement the different steps of the process 50 of acquisition.

It should be noted that, in a conventional manner, satellite 20 may also comprise other elements such as sensors (star tracker, rate gyro, etc.), which may also be connected to the processing circuit.

Figure 10:
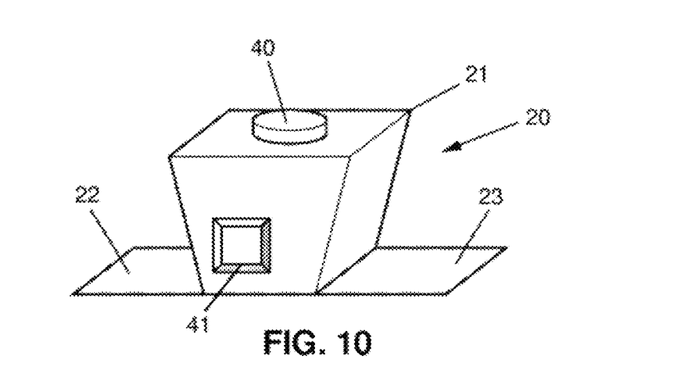
FIG. 10: a schematic representation of a second exemplary embodiment of a satellite for implementing a process of acquisition.

FIG. 10 schematically represents one exemplary embodiment of a satellite 20 for implementing the process 50 of acquisition, in the case where the array-type detection sensor and the array-type acquisition sensor are two separate array-type sensors. Satellite 20 of FIG. 10 incorporates the elements of satellite 20 of FIG. 9, array-type sensor 40 corresponding to the array-type acquisition sensor. Satellite 20 further comprises an array-type detection sensor 41, arranged in this non-limiting example on a side face of body 21 of satellite 20.

Array-type detection sensor 41 may have a wider field of view than array-type acquisition sensor 40, in order to further reduce the probability of missing space object 30 during the acquisition of detection images. Array-type detection sensor 41 is for example dedicated to the acquisition of detection images. Alternatively, the array-type detection sensor may also be utilized to accomplish other tasks. For example, array-type detection sensor 41 may be a star tracker that is also used to estimate the attitude of satellite 20.

The invention claimed is:

1. A method for the acquisition, by a spacecraft in terrestrial orbit, of a so-called useful image of a space object in terrestrial orbit, said space object being visible from the spacecraft on a trajectory along which the space object is gradually approaching the spacecraft from an upstream distal region of said trajectory towards a proximal region of said trajectory where a distance between the space object and the spacecraft is minimized, said method comprising steps of:
controlling an orientation of an array-type detection sensor of the spacecraft in order to orient a line of sight of the array-type detection sensor towards the space object when said space object is located in the upstream distal region,
acquiring, by the array-type detection sensor, at least one so-called detection image of the space object located in the upstream distal region,
determining trajectory-tracking information on the basis of the at least one detection image,
controlling an orientation of an array-type acquisition sensor, on the basis of the trajectory-tracking information, in order to orient a line of sight of the array-type acquisition sensor towards the space object when said space object is located in the proximal region,
acquiring, by the array-type acquisition sensor, at least one useful image of the space object located in the proximal region, the space object being represented in the at least one useful image with a better resolution than in the at least one detection image.

2. The method according to claim 1, wherein the array-type acquisition sensor of the spacecraft is also utilized to acquire images of areas on the surface of the Earth.

3. The method according to claim 2, wherein the line of sight of the array-type acquisition sensor is fixed in the spacecraft frame of reference, and controlling the orientation of said array-type acquisition sensor consists of controlling the attitude of the spacecraft.

4. The method according to claim 1, wherein the array-type detection sensor and the array-type acquisition sensor are a same array-type sensor, the method comprising:
successive acquisitions of so-called tracking images, by the array-type sensor, during movement of the space object from the upstream distal region to the proximal region, and determination of associated trajectory-tracking information,
controlling the orientation of the array-type sensor during the successive acquisitions of tracking images, on the basis of the trajectory-tracking information, in order to keep the space object in a field of view of said array-type sensor.

5. The method according to claim 1, comprising a step of predicting, on the basis of the trajectory-tracking information, a position of the space object at a later time referred to as the "tracking resumption time", and wherein the orientation of the array-type acquisition sensor is controlled so as to have the line of sight of said array-type acquisition sensor oriented towards the predicted position at the tracking resumption time.

6. The method according to claim 5, wherein the predicted position for the tracking resumption time is determined by means of an estimation filter, and the trajectory-tracking information determined for the detection image is used to readjust a state vector of the estimation filter.

7. The method according to claim 5, comprising, after the acquisition of the at least one detection image and before the acquisition of the at least one useful image, an acquisition of one or more images of areas on the surface of the Earth by the array-type acquisition sensor.

8. The method according to claim 5, wherein the array-type detection sensor is separate from the array-type acquisition sensor.

9. The method according to claim 8, wherein the array-type detection sensor is a star tracker which is also utilized to estimate the attitude of the spacecraft.

10. The method according to claim 5, wherein the array-type detection sensor and the array-type acquisition sensor are the same array-type sensor.

11. The method according to claim 1, wherein controlling the orientation in order to acquire the at least one detection image comprises controlling the line of sight of the array-type sensor in order to successively orient said line of sight towards different possible positions of the space object in the upstream distal region of the trajectory, until at least one detection image representing said space object is obtained.

12. A spacecraft intended to be placed in terrestrial orbit, comprising:
at least one orientable array-type sensor adapted for acquiring images,
a processing circuit configured for controlling the at least one array-type sensor and its orientation, in order to implement a process for the acquisition of a useful image according to claim 1.

13. The spacecraft according to claim 12, wherein the at least one array-type sensor comprises an array-type detection sensor for the acquisition of detection images and an array-type acquisition sensor for the acquisition of useful images, said array-type detection sensor being separate from the array-type acquisition sensor.

14. The spacecraft according to claim 13, wherein the array-type detection sensor is a star tracker which is also utilized to estimate the attitude of the spacecraft.

15. The spacecraft according to claim 12, wherein the at least one array-type sensor comprises a single array-type sensor for the acquisition of detection images and for the acquisition of useful images.

* * * * *